United States Patent
Makley et al.

(10) Patent No.: US 8,264,824 B2
(45) Date of Patent: Sep. 11, 2012

(54) DRIVE BAY ASSEMBLY

(75) Inventors: Albert V. Makley, Morrisville, NC (US);
William F. Martin-Otto, Apex, NC
(US); Marc R. Pamley, Durham, NC
(US); Timothy S. Farrow, Cary, NC
(US)

(73) Assignee: Lenovo (Singapore) Pte. Ltd.,
Singapore (SG)

( * ) Notice: Subject to any disclaimer, the term of this patent is extended or adjusted under 35 U.S.C. 154(b) by 259 days.

(21) Appl. No.: 12/729,406

(22) Filed: Mar. 23, 2010

(65) Prior Publication Data

US 2011/0239234 A1 Sep. 29, 2011

(51) Int. Cl.
*G06F 1/16* (2006.01)
(52) U.S. Cl. .................................. 361/679.01
(58) Field of Classification Search ............. 361/679.01, 361/679.33
See application file for complete search history.

(56) References Cited

U.S. PATENT DOCUMENTS

| | | | |
|---|---|---|---|
| 5,513,068 A * | 4/1996 | Girard | 361/679.37 |
| 6,122,173 A * | 9/2000 | Felcman et al. | 361/726 |
| 6,590,848 B1 * | 7/2003 | Chen | 720/654 |
| 6,693,796 B2 * | 2/2004 | Ives et al. | 361/679.36 |
| 6,906,915 B2 * | 6/2005 | Tucker et al. | 361/679.33 |
| 7,190,574 B2 * | 3/2007 | Muenzer et al. | 361/679.32 |
| 7,200,003 B2 * | 4/2007 | Hood et al. | 361/679.33 |
| 7,289,317 B2 * | 10/2007 | Hood et al. | 361/679.33 |
| 7,352,569 B2 * | 4/2008 | Muenzer et al. | 361/679.33 |
| 7,864,519 B2 * | 1/2011 | Lin et al. | 361/679.33 |
| 2007/0008693 A1 * | 1/2007 | Yeh et al. | 361/685 |
| 2007/0127204 A1 * | 6/2007 | Muenzer et al. | 361/685 |

* cited by examiner

*Primary Examiner* — Lisa Lea Edmonds
(74) *Attorney, Agent, or Firm* — Brian J. Pangrle (57) ABSTRACT

An exemplary assembly includes a drive that includes two substantially parallel sides and, for receipt of media, a substantially rectangular opening; a plate that includes a tab; a positioning mechanism to position the plate with respect to either one of the two parallel sides of the drive; and a bay configured to at least partially receive the drive, with the plate, in first and second orientations of the substantially rectangular opening with respect to the bay where the bay includes a lower slot configured to receive the tab if the plate is positioned with respect to one of the two parallel sides of the drive in the first orientation of the opening and where the bay includes an upper slot configured to receive the tab if the plate is positioned with respect to the other of the two parallel sides of the drive in the second orientation of the opening. Various other apparatuses, systems, methods, etc., are also disclosed.

18 Claims, 6 Drawing Sheets

DRIVE BAY ASSEMBLY

TECHNICAL FIELD

Subject matter disclosed herein generally relates to drive bays and drive bay assemblies.

BACKGROUND

A conventional computer is an assembly of parts or components. For example, a conventional computer typically includes a variety of components installed in a housing (e.g., a frame, a case, etc.). Such components may include a motherboard, memory and one or more media drives. Often, a media drive is seated in a drive bay where the drive bay dictates the orientation of the media drive with respect to the housing. As described herein, various exemplary components can provide for multiple orientations of a media drive with respect to a computer housing or other housing configured for installation of one or more media drives.

SUMMARY

An exemplary assembly includes a drive that includes two substantially parallel sides and, for receipt of media, a substantially rectangular opening; a plate that includes a tab; a positioning mechanism to position the plate with respect to either one of the two parallel sides of the drive; and a bay configured to at least partially receive the drive, with the plate, in first and second orientations of the substantially rectangular opening with respect to the bay where the bay includes a lower slot configured to receive the tab if the plate is positioned with respect to one of the two parallel sides of the drive in the first orientation of the opening and where the bay includes an upper slot configured to receive the tab if the plate is positioned with respect to the other of the two parallel sides of the drive in the second orientation of the opening. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
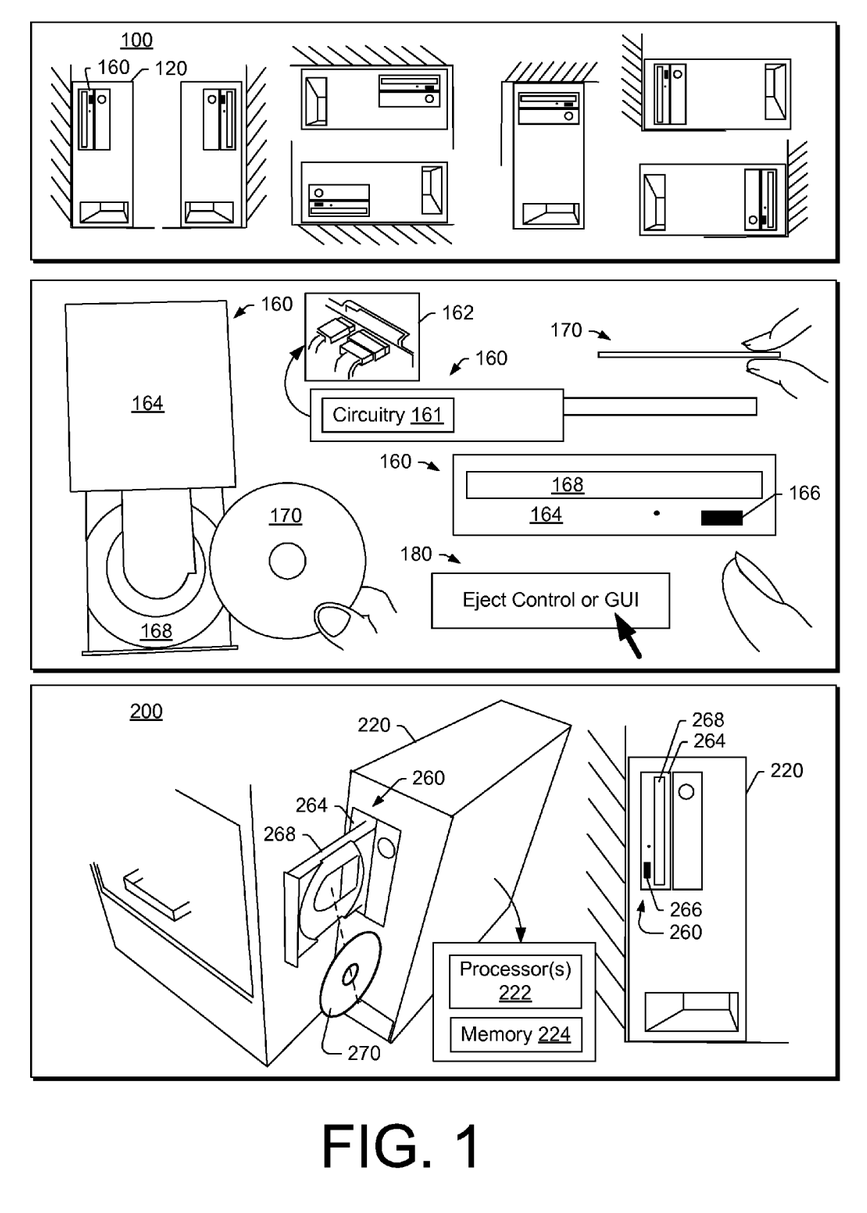
FIG. 1 is a diagram of a various computers, a media drive and arrangements thereof.

FIG. 1 shows various arrangements of a computer 120 with respect to one or more walls or, more generally, obstructions. The computer 120 includes a media drive 160. While the drive 160 is shown as being configured to receive a disk 170, such a drive may be configured to receive other types of media (e.g., a card such as memory card). In the example of FIG. 1, the drive 160 includes a drive body 164 and a media tray 168 that can extend from the drive body 164 for receipt of disk 170 (e.g., removable media). The drive 160 includes circuitry 161 and connectors 162 (e.g., for power and communication). The drive may include a control 166 (e.g., depressible button, heat sensor, impedance sensor, etc.) that can be activated by a user (e.g., a finger, a pen, etc.). For example, the circuitry 161 may be configured to receive a command signal via a communication connection to facilitate removal or insertion of media. Consider a command signal, received by the circuitry 161 via a communication interface (e.g., wired or wireless) to instruct the drive 160 to eject media (via a slot), extend the tray 168, etc. As indicated in FIG. 1, an eject control (e.g., tray control) or graphical user interface (GUI) 180 associated with a computer (e.g., operating system, etc.) or other housed circuitry may be available for commanding the drive 160.

In the example of FIG. 1, the various arrangements 100 can present some access issues that may dictate where the computer 120 is placed with respect to a wall, a cabinet, a desk or some other obstruction. For example, users frequently find themselves forced to locate computer tower systems up against a cabinet or a wall or some other obstruction. Many times, they need to locate it on a side which gives them very little access to a drive seated in a drive bay. Consider a 5.25 inch media drive with a tray for receipt of removable media (e.g., a disk) where, due to the nature of a chassis design, the 5.25 inch media drive is positioned very close to the top system surface. If such a system is located up against an obstruction on the top surface side, there would be almost no clearance for a user to access the 5.25 inch media drive tray.

As described herein, an exemplary dual orientation drive bay allows a user to change (optionally tool-lessy) the orientation of a media drive (e.g., by 180 degrees). Accordingly, if an obstruction exists along a top side of a housing, a user could readily orient a media drive with a tray such that the tray faces downward instead of upward. In this example, the downward facing tray allows a user to more easily remove or insert media in the tray.

Where a media drive includes a slot for receipt of media, an exemplary drive bay can allow a user to orient a media drive to increase the distance between the slot and the obstruction (e.g., wall, cabinet, desk, desktop, table, etc.). Even a few millimeters can make a difference for a user when one considers dimensions of a thumb/finger grasp of removable media (e.g., generally between about 0.5 inch (1.25 cm) and about 1.5 inch (3.8 cm) nail-to-nail for an optical disk).

FIG. 1 shows an arrangement 200 that includes a computer 220 with a media drive 260 seated in an exemplary drive bay assembly. As shown, the computer 220 is located adjacent a side wall of a file cabinet. The media drive 260 is oriented such that the tray 268 extends from the drive body 264 to readily allow for insertion of the removable media 270. In this example, the computer 220 includes one or more processors 222 and memory 224, which are configured for communication with the media drive 260 (see, e.g., circuitry 161 and connectors 162) and which may be configured to present one or more controls (see, e.g., the control 180). In general, a computer such as the computer 220 includes power circuitry to provide power for operation of one or more media drives such as the media drive 260. As described herein, a media drive may be a standard media drive, for example, a standard drive specified by a SFF specification (e.g., SFF-8000), an ASC specification, an EIA specification, an IEC specification, etc.

Figure 2:
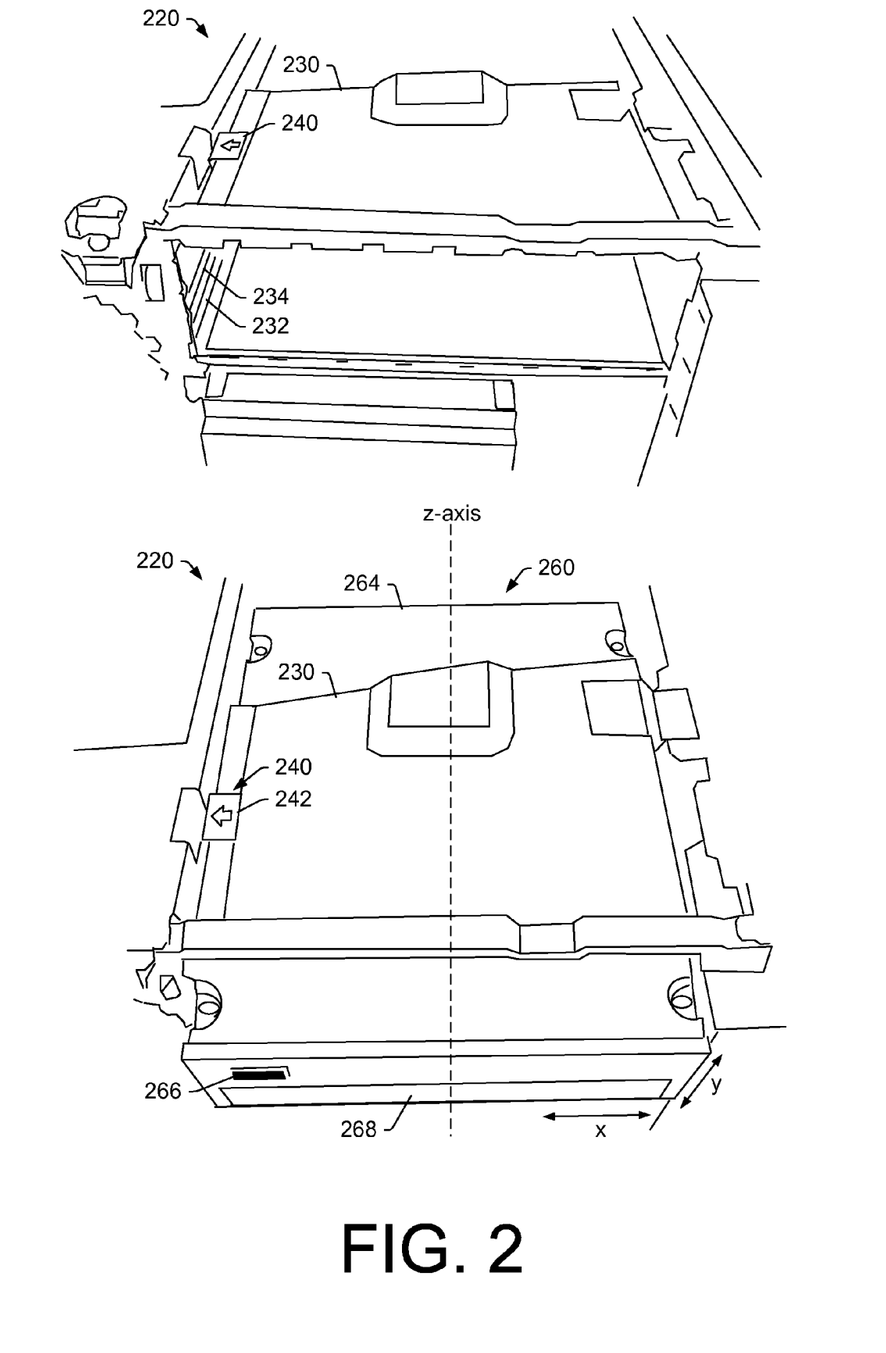
FIG. 2 is two perspective views of an exemplary drive bay.

FIG. 2 shows two perspective views of the exemplary computer 220 with an exemplary drive bay 230 installed. In one view (lower view), a media drive 260 is shown seated in the drive bay 230. In the example of FIG. 2, the drive bay 230 includes substantially parallel slots 232 and 234 (e.g., extending along a z direction). In this particular arrangement, the slot 232 is referred to as a lower slot and the slot 234 is referred to as an upper slot. The drive bay 230 further includes a locking mechanism 240 for locking the media drive 260 in the drive bay 230. In the example of FIG. 2, the locking mechanism 240 includes a release 242 where an outward displacement of the release 242 (see arrow) causes the locking mechanism 240 to release the media drive 260 from the drive bay 230. Further, in the example of FIG. 2, the tray 268 is oriented toward a lower side of the drive bay 230. As described herein, the exemplary drive bay 230 also allows the drive 260 to be oriented with the tray 268 toward an upper side of the drive bay 230. Specifically, in the example of FIG. 2, the media drive 260 may be rotated by 180 degree about a long axis (e.g., z-axis) and seated in the drive bay 230.

Figure 3:
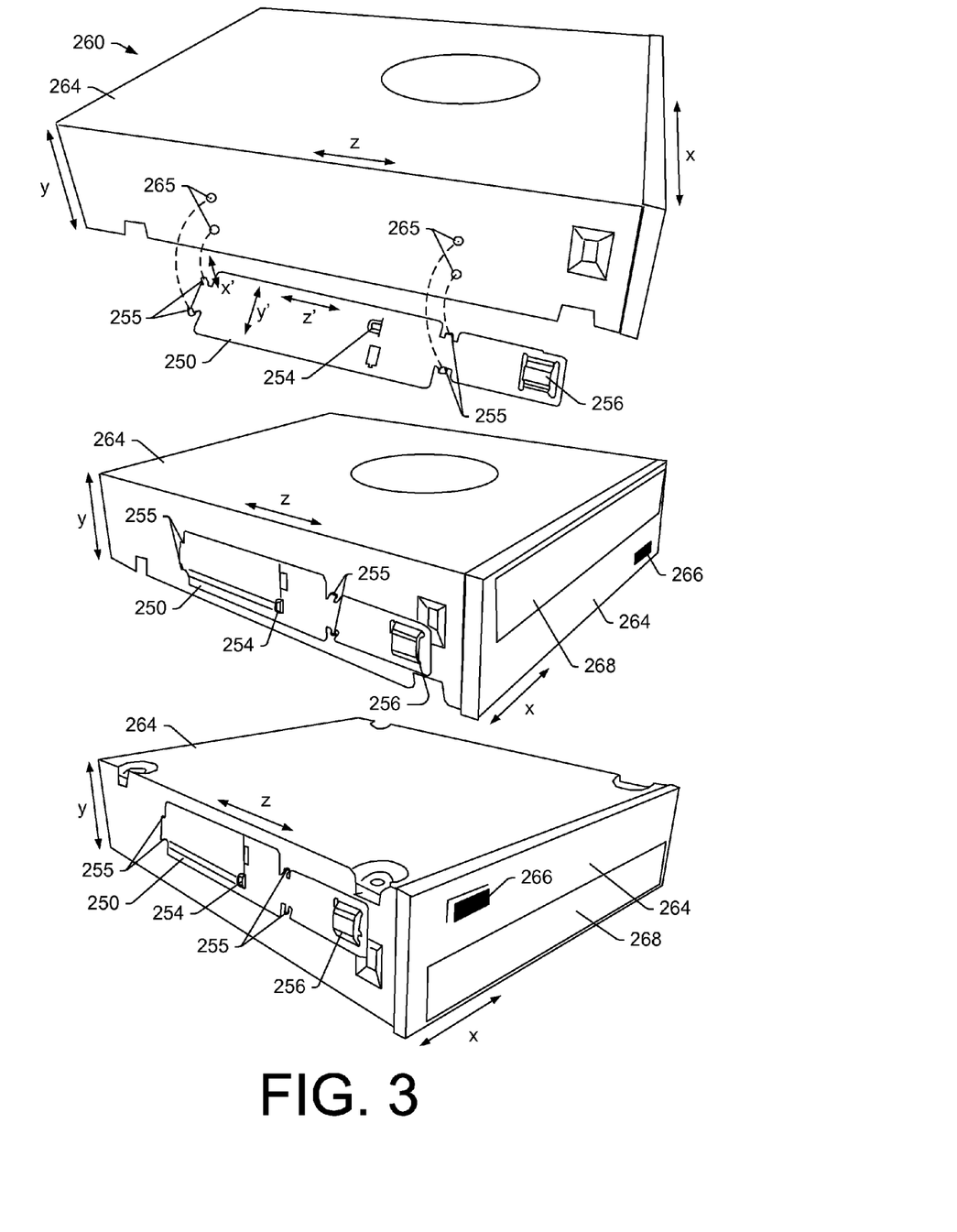
FIG. 3 is three perspective views of an exemplary plate and media drive assembly.

FIG. 3 shows three perspective views of the media drive 260 with respect to a component 250 of an exemplary drive bay assembly. The views are shown with respect to directions x, y and z for the media drive 260 and directions x', y' and z' for the component 250. The component 250 cooperates with the drive body 264 as well as with either the lower slot 232 or the upper slot 234 of the drive bay 230 of FIG. 2.

As described herein, a positioning mechanism exists that allows for positioning the component 250 with respect to the drive body 264. In the example of FIG. 3, the positioning mechanism includes openings 265 in the drive body 264 and prongs 255 extending from the component 250. As indicated by dashed lines, each of the prongs 255 is received by a respective one of the openings 265.

In a middle perspective view of FIG. 3, the component 250 is shown positioned with respect to the drive body 264 in a first orientation (see the tray 268 or substantially rectangular opening for receipt of media) while, in a lower perspective view, the component 250 is shown positioned with respect to the drive body 264 in a second orientation (see the tray 268 or substantially rectangular opening for receipt of media). As shown in FIG. 3, the positioning mechanism aligns the directions x, y and z of the media drive 260 with the directions x', y' and z' of the component 250.

In the example of FIG. 3, the component 250 includes various features. For example, the component 250 includes a tab 254 and a stop 256. As described herein, the component 250 may be manufactured by stamping metal stock. A stamping process may stamp the component 250 from a flat piece of metal (e.g., y'z'-plane) and in the same process, or one or more subsequent processes, form the prongs 255, the tab 254 and the stop 256 as features that extend outwardly (e.g., x' direction) from a plane defined by a flat portion of the component 250 (e.g., y'z'-plane).

The component 250 is referred to herein, at times, as a plate; noting that in the example of FIG. 3, one or more features extend outwardly from a plane defined by the plate (e.g., the prongs 255 extending outwardly in one direction and the tab 254 and the stop 256 extending outwardly in an opposing direction). The tab 254 is referred to herein, at times, as a protrusion.

Referring again to the first and second orientations, in the first orientation, the tab 254 is in a lower position (e.g., lower y), which allows for receipt of the tab 254 by the lower slot 232 of the drive bay 230. In the second orientation, the tab 254 is in an upper position (e.g., upper y), which allows for receipt of the tab 254 by the upper slot 234 of the drive bay 230. For example, in the view of FIG. 2, where the media drive 260 is seated in the drive bay 230, the tab 254 of the plate 250 is received by the upper slot 234; noting that the upper slot 234 is shown in the other view of FIG. 2 (drive bay 230 without media drive 260).

In the example of FIG. 3, for the two orientations, the plate 250 is merely shifted along the y dimension of the media drive 260, which, in turn, determines whether the tab 254 will be received by the lower slot 232 (lower y) or the upper slot 234 (upper y) of the drive bay 230.

In the example of FIG. 3, the media drive 260 may be a drive specified by a SFF specification. For example, a "5.25 inch" drive includes four openings on each side of the drive spaced at corners of a rectangle with a length of 3.12 in (79.24 mm) and a width of 0.47 in (11.9 mm) where the rectangle is offset towards the lower and front edges of the sides of the drive. In a SFF specification, such a drive has a length of about 8 in (204.7 mm), a height of about 3.25 in (82.55 mm) and a width of about 5.75 in (146.05 mm).

Figure 4:
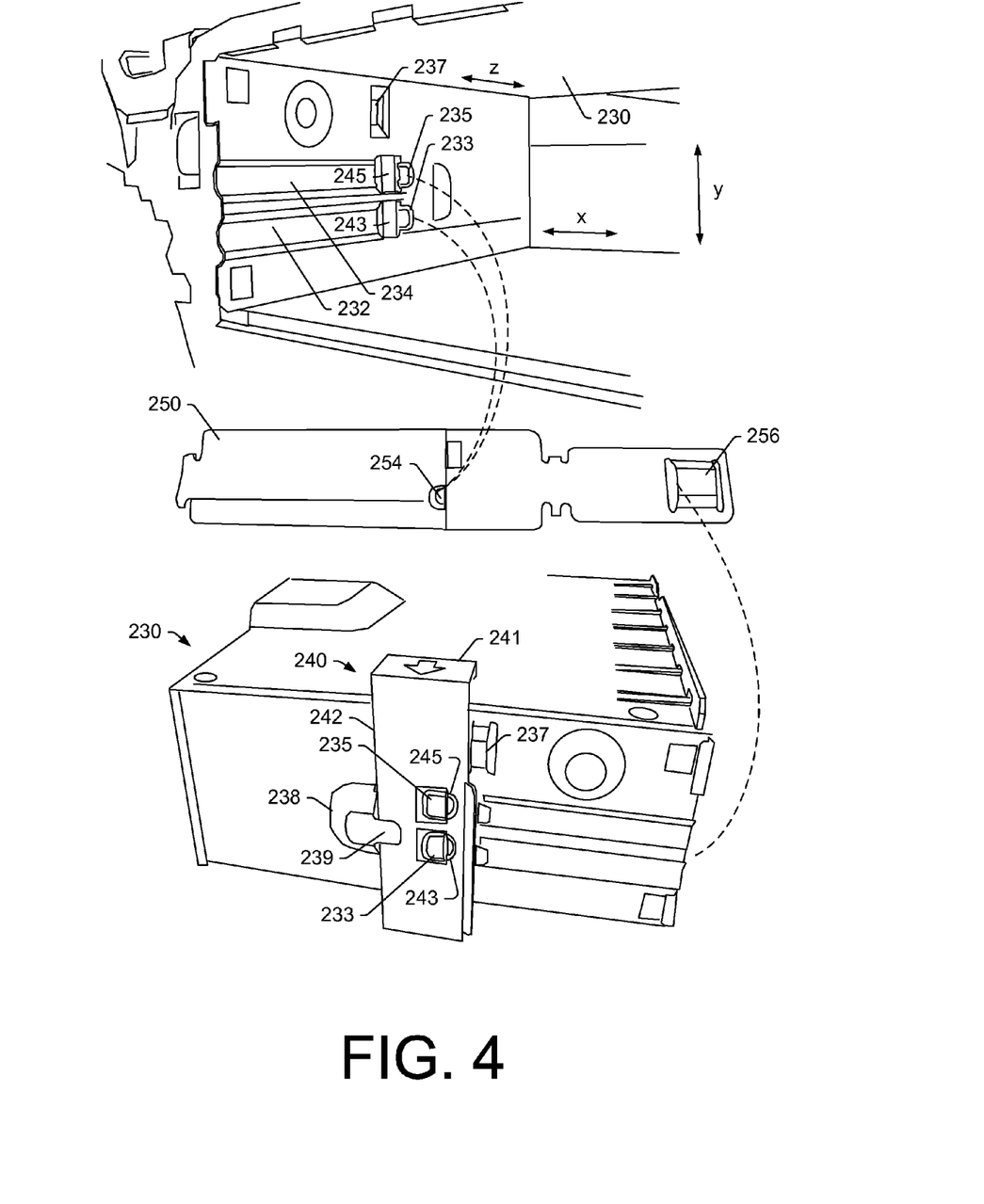
FIG. 4 is two perspective views of an exemplary drive bay that illustrate a locking mechanism.

FIG. 4 shows an exemplary drive bay assembly that includes the drive bay 230, the locking mechanism 240 and the plate 250. As indicated by dashed lines, the tab 254 of the plate 250 may be received by the lower slot 232 or the upper slot 234 of the drive bay 230. In the example of FIG. 4, the tab 254 performs two functions: guiding a drive body along a slot (e.g., z direction) and cooperating with a locking mechanism to lock a drive body in a drive bay.

As shown in FIG. 4, the locking mechanism 240 includes a release 241 for moving a member 242 with respect to the drive bay 230. The drive bay 230 includes a guide 237 and a brace 238 where an extension 239 extends from the brace 238 (e.g., in the z direction). The member 242 is located between the guide 237 and the brace 238 and limited in movement by the extension 239. The member 242 further includes a lower locking tab 243 and an upper locking tab 245. The locking tabs 243 and 245 are configured for receipt by corresponding lower and upper locking openings 233 and 235 of the drive bay 230. Where the locking tabs 243 and 245 are received by the locking openings 233 and 235, the slots 233 and 234 are obstructed. Accordingly, where the tab 254 is located at a sufficient depth (z direction) in the lower slot 232 or in the upper slot 234, one of the locking tabs 243 or 245 obstructs movement of the tab 254 in the lower slot 232 or in the upper slot 234.

As shown in the example of FIG. 4, the tab 254 and the locking tabs 243 and 245 are configured to allow the tab 254 to pass by either of the locking tabs 243 or 245 when a media drive with the plate 250 positioned is slid into the drive bay 230 (along z direction). Once the tab 254 passes by a corresponding one of the locking tabs 243 or 245, the member 242 is biased such that the locking tabs 243 and 245 seat in the locking openings 233 and 235 to obstruct the slots 232 and 234.

To unlock a media drive and plate assembly from the drive bay 230, the release 241 of the locking mechanism 240 is moved outwardly (x direction), which causes the locking tabs 243 and 245 to move a distance sufficient to allow passage of the tab 254 (z direction).

With respect to bias of the member 242, the arrangement of features of the drive bay 230 may provide for such biasing. For example, the extension 239 may be configured to provide a bias to the member 242 such that application of force to the release 241, in the x direction, causes the member to tilt outwardly along an edge aligned by the guide 237 without the edge passing by the guide 237. In this example, the amount of tilt is sufficient to move the locking tabs 243 and 245 a distance sufficient for passage of the tab 254 in its slot (the slot 232 or the slot 234). Further, in this example, the bias force may be selected such that application of user force directly to the release 241 is not required upon seating a media drive and plate in the drive bay 230. Specifically, during seating, when the tab 254 contacts a corresponding one of the locking tabs 243 or 245, the tab 254 applies a force to the member 242 (via the locking tab 243 or 245) such that the locking tab 243 or 245 moves outwardly (x direction) to provide for passage of the tab 254 (z direction). Once the tab 254 moves a sufficient distance in the z direction, the biased member 242 causes the locking tabs 243 and 245 to move into (or deeper into) the openings 233 and 235 and lock the tab 254 in its corresponding slot 232 or 234. Accordingly, the tab 254 may be engaged by a feature of a locking mechanism during seating of a media drive in a bay and disengaged from that feature for removal of the media drive from the bay (e.g., to allow for re-orientation). As described herein, one or more other types of biasing features may be part of a locking mechanism that, for example, biases one or more locking tabs.

Figure 5:
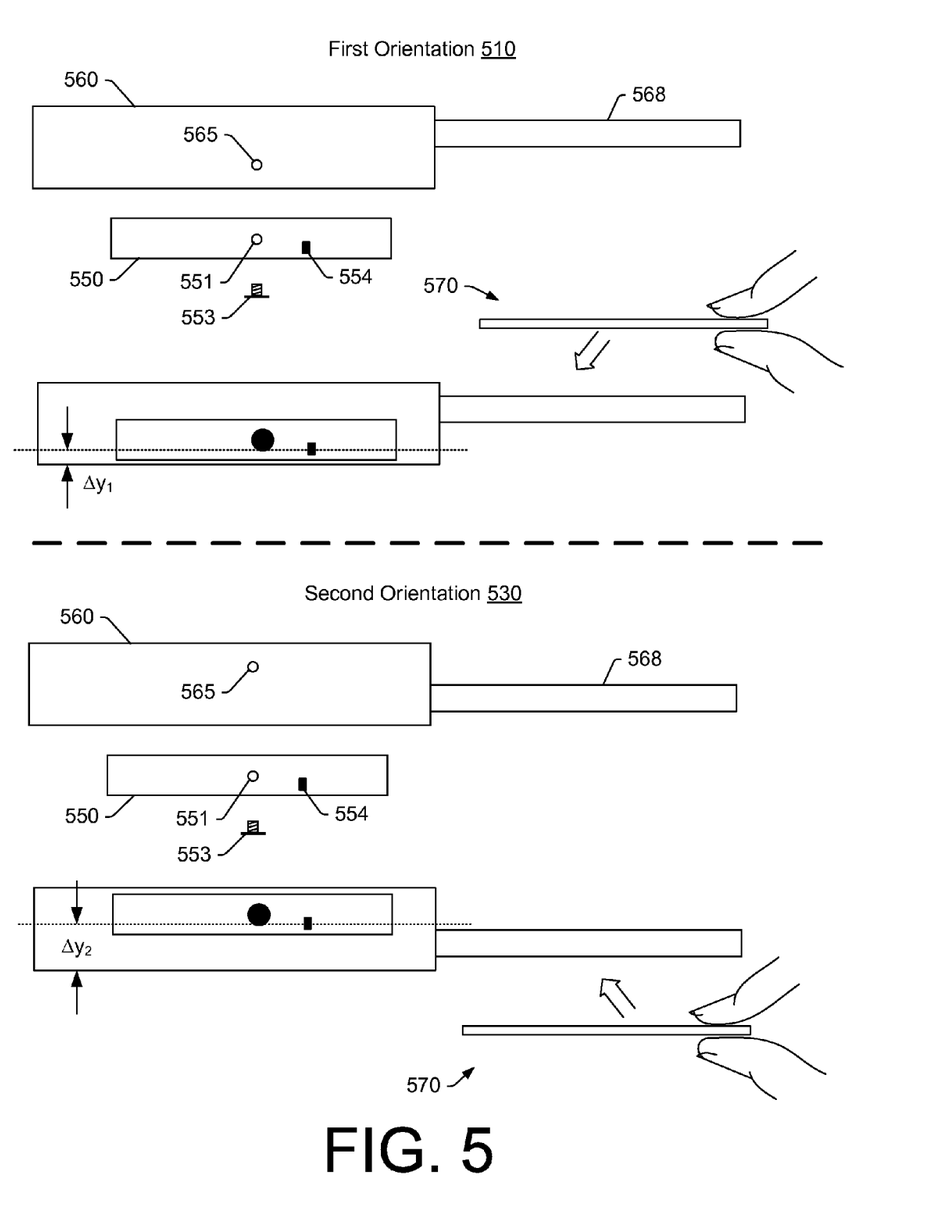
FIG. 5 is a series of side views of an exemplary plate and media drive assembly in a first orientation and in a second orientation.

FIG. 5 shows a media drive 560 and a plate 550 in a first orientation 510 and the media drive 560 and the plate 550 in a second orientation 530. In the example of FIG. 5, a positioning mechanism for positioning the plate 550 with respect to the media drive includes an drive side opening 565, a plate opening 551 and a fixation component 553 (e.g., a plug, a threaded bolt, etc.) where the fixation component (or components) is seated in a manner that does not interfere with sliding, locking, etc. In the example of FIG. 5, the fixation component 553 is inserted into the opening 551 of the plate 550 and received by the opening 565 of the media drive 560. Accordingly, the plate 550 is positioned with respect to the media drive 560. In the first orientation 510, a distance $\Delta y_1$ exists between a lower edge of the media drive 560 and a tab 554 of the plate 550. In the second orientation 530, a distance $\Delta y_2$ exists between a lower edge of the media drive 560 and the tab 554 of the plate 550. As described herein, in an exemplary re-orientation process, a user may slide a media drive out of a bay (first orientation), remove its plate, reposition the plate and slide the media drive back into the bay (second orientation).

While the media drive 560 includes a tray 568, in other examples, it may include an opening (e.g., substantially rectangular opening) for receipt and removal of media (e.g., a disk, a card, etc.). As mentioned, where an exemplary drive bay includes slots to receive the tab 554 in both orientations 510, 530, the media drive 560 may be oriented accordingly, for example, to ease access to a tray, an opening, etc., for insertion and ejection of media (e.g., a disk, a card, etc.).

As described herein, an exemplary assembly includes a drive that includes two substantially parallel sides and, for receipt of media, a substantially rectangular opening; a plate that includes a tab; a positioning mechanism to position the plate with respect to either one of the two parallel sides of the drive; and a bay configured to at least partially receive the drive, with the plate, in first and second orientations of the substantially rectangular opening with respect to the bay where the bay includes a lower slot configured to receive the tab if the plate is positioned with respect to one of the two parallel sides of the drive in the first orientation of the opening and where the bay includes an upper slot configured to receive the tab if the plate is positioned with respect to the other of the two parallel sides of the drive in the second orientation of the opening.

An exemplary assembly may include a drive with a tray, for example, the tray may be seated at least partially in a substantially rectangular opening. Such a tray may be configured to receive a disk from one of two opposing sides of the tray.

An exemplary assembly may include a positioning mechanism with one or more prongs that extend outward from a plane defined by a plate and one or more openings in each of two substantially parallel sides of a media drive where each of the one or more openings are configured for receipt of one of the one or more prongs. Such a positioning mechanism may allow for tool-less seating or re-orientation of a media drive in a bay.

As described herein, an exemplary positioning mechanism may include threaded openings on each of the substantially parallel sides and a threaded component configured for receipt by one of the threaded openings to position the plate with respect to the drive. In such an example, the threaded component may be configured for rotation by a finger or fingers (e.g., tool-less), rotation with a tool or a combination of tool-less and tool rotation.

An exemplary assembly may include a locking mechanism, to lock a tab in either of a lower slot or an upper slot of a bay. Further, each of the slots may include an opening configured for receipt of a portion of the locking mechanism to lock a media drive in the bay.

As described herein, an exemplary plate may be a stamped metal plate. An exemplary plate can optionally include a stop that extends outward from a plane defined by the plate where the stop is configured to abut an edge of a bay to limit movement of a drive in the bay.

As described herein, an exemplary computer includes a case; a drive bay; and a drive configured for receipt of a removable storage medium where the drive includes a plate positioned with respect to one of two substantially parallel sides of the drive, where the plate includes a protrusion, and where the drive bay includes a receptacle configured to receive the protrusion in first and second orientations, dictated by position of the plate with respect to the drive, to mount the drive in first and second orientations with respect to the case. As to the receptacle, the bay may include two substantially parallel slots. As to the drive, it may include a tray configured to extend outwardly from a surface of the computer where the tray is configured to receive the removable storage medium from one of two opposing sides. In such an example, the first and second orientations of the drive with respect to the case can correspond to first and second orientations of the tray. As to the drive bay, it may include a locking mechanism to lock the drive in the drive bay.

Figure 6:
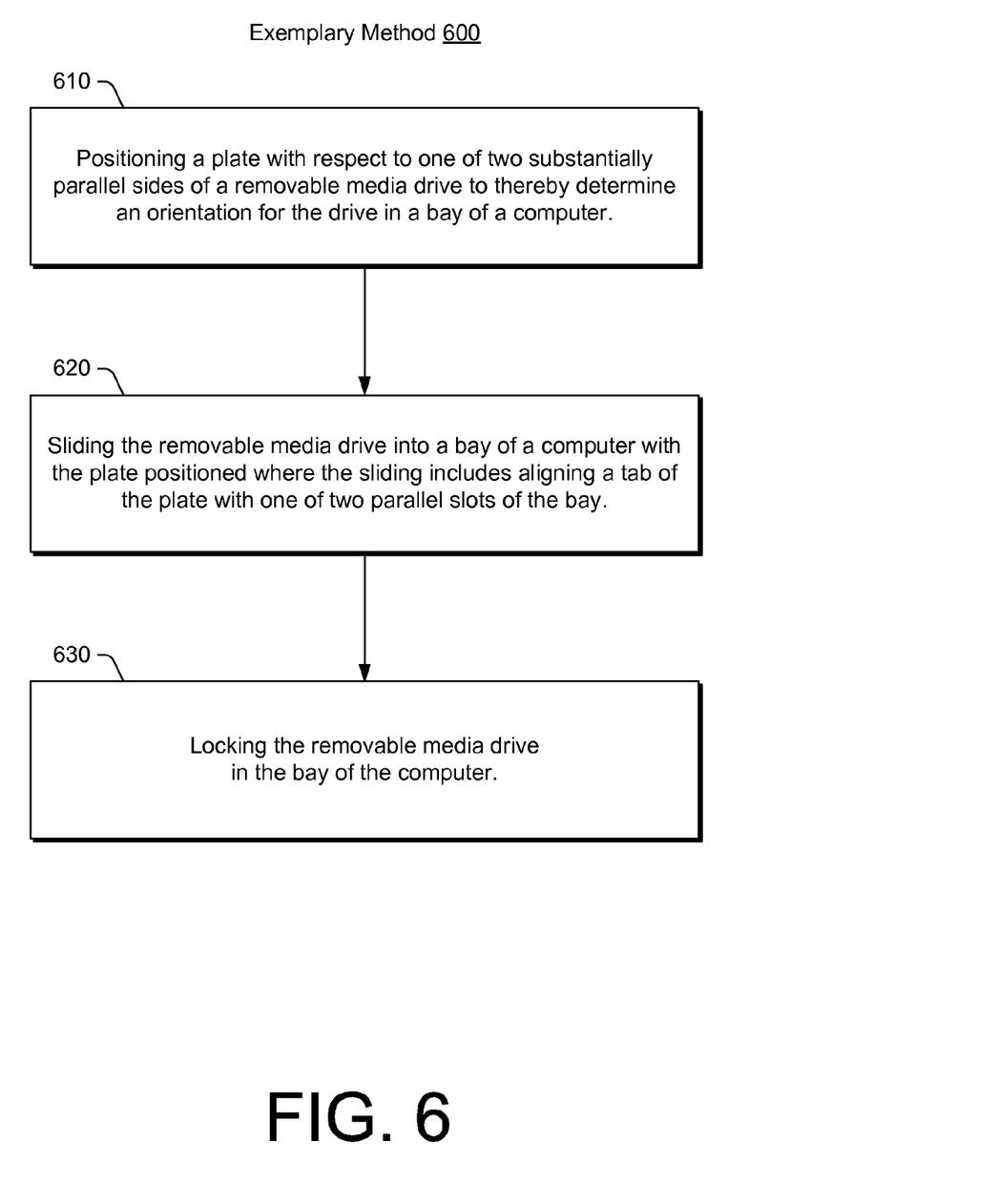
FIG. 6 is a diagram of an exemplary method for sliding a media drive into a bay and locking the media drive in the bay.

FIG. 6 shows an exemplary method 600 for seating a removable media drive in a drive bay. The method 600 includes positioning a plate 610 with respect to one of two substantially parallel sides of a removable media drive to thereby determine an orientation for the drive in a bay of a computer; sliding the removable media drive (with the plate positioned) into a bay of a computer 620 where the sliding includes aligning a tab of the plate with one of two parallel slots of the bay; and locking the removable media drive in the bay of the computer 630. As described herein, the positioning can include inserting prongs of the plate into openings of one of the two substantially parallel sides of the removable media drive. As mentioned, an exemplary method may include instructing a removable media drive to extend a tray configured for receipt of removable media. As mentioned, an exemplary method may allow for tool-less re-orientation of a media drive in a drive bay, for example, to allow for relocating a computer or other housing with respect to a wall, a cabinet, a desk, a table, etc.

With respect to a locking mechanism, an exemplary method can include positioning an obstruction to obstruct movement of the tab in one of the two parallel slots of the bay and optionally unlocking the removable media drive by removing the obstruction.

Although some exemplary methods, devices, systems, arrangements, etc., have been illustrated in the accompanying Drawings and described in the foregoing Detailed Description, it will be understood that these examples as disclosed are not limiting, but are capable of numerous rearrangements, modifications and substitutions without departing from the spirit set forth and defined by the following claims.

The invention claimed is:

1. An assembly comprising:
 a drive that comprises two substantially parallel sides and, for receipt of media, a substantially rectangular opening;
 a plate that comprises a tab;
 a positioning mechanism to position the plate with respect to either one of the two parallel sides of the drive;
 a bay configured to at least partially receive the drive, with the plate, in first and second orientations of the substantially rectangular opening with respect to the bay
  wherein the bay comprises a lower slot configured to receive the tab if the plate is positioned with respect to one of the two parallel sides of the drive in the first orientation of the opening and
  wherein the bay comprises an upper slot configured to receive the tab if the plate is positioned with respect to the other of the two parallel sides of the drive in the second orientation of the opening; and
 a locking mechanism to lock the tab in either the lower slot or the upper slot.

2. The assembly of claim 1 wherein the drive comprises a tray seated at least partially in the substantially rectangular opening, the tray configured to receive a disk from one of two opposing sides of the tray.

3. The assembly of claim 1 wherein the positioning mechanism comprises one or more prongs that extend outward from a plane defined by the plate and one or more openings in each of the two substantially parallel sides of the drive, each of the one or more openings configured for receipt of one of the one or more prongs.

4. The assembly of claim 1 wherein each of the slots comprises an opening configured for receipt of a portion of the locking mechanism to lock the drive in the bay.

5. The assembly of claim 1 wherein the plate comprises a stop that extends outward from a plane defined by the plate wherein the stop abuts an edge of the bay to limit movement of the drive in the bay.

6. The assembly of claim 1 wherein the drive comprises one or more threaded openings on each of the substantially parallel sides.

7. The assembly of claim 6 wherein the positioning mechanism comprises a threaded component configured for receipt by one of the threaded openings to position the plate with respect to the drive.

8. The assembly of claim 1 wherein the plate comprises a stamped metal plate.

9. The assembly of claim 1 wherein the drive comprises an optical drive configured for receipt of an optical disk.

10. A method comprising:
 positioning a plate with respect to one of two substantially parallel sides of a removable media drive to thereby determine an orientation for the drive in a bay of a computer;
 sliding the removable media drive into a bay of a computer with the plate positioned wherein the sliding comprises aligning a tab of the plate with one of two parallel slots of the bay; and
 locking the removable media drive in the bay of the computer wherein the locking comprises positioning an obstruction to obstruct movement of the tab in one of the two parallel slots of the bay.

11. The method of claim 10 wherein the positioning comprises inserting prongs of the plate into openings of one of the two substantially parallel sides of the removable media drive.

12. The method of claim 10 further comprising unlocking the removable media drive by removing the obstruction.

13. The method of claim 10 further comprising instructing the removable media drive to extend a tray configured for receipt of removable media.

14. A computer comprising:
 a case;
 a drive bay;
 a drive configured for receipt of a removable storage medium
  wherein the drive comprises a plate positioned with respect to one of two substantially parallel sides of the drive,
  wherein the plate comprises a protrusion, and
  wherein the drive bay comprises a receptacle configured to receive the protrusion in first and second orientations, dictated by position of the plate with respect to the drive, to mount the drive in first and second orientations with respect to the case; and
 a locking mechanism to lock the drive in the drive bay.

15. The computer of claim 14 wherein the receptacle comprises two substantially parallel slots.

16. The computer of claim 14 wherein the drive comprises a tray configured to extend outwardly from a surface of the computer, the tray configured to receive the removable storage medium from one of two opposing sides.

17. The computer of claim 16 wherein the first and second orientations of the drive with respect to the case correspond to first and second orientations of the tray.

18. An assembly comprising:
 a drive that comprises two substantially parallel sides, a substantially rectangular opening for receipt of media, and a tray seated at least partially in the substantially rectangular opening, the tray configured to receive a disk from one of two opposing sides of the tray;
 a plate that comprises a tab;
 a positioning mechanism to position the plate with respect to either one of the two parallel sides of the drive; and
 a bay configured to at least partially receive the drive, with the plate, in first and second orientations of the substantially rectangular opening with respect to the bay
  wherein the bay comprises a lower slot configured to receive the tab if the plate is positioned with respect to one of the two parallel sides of the drive in the first orientation of the opening and
  wherein the bay comprises an upper slot configured to receive the tab if the plate is positioned with respect to the other of the two parallel sides of the drive in the second orientation of the opening.

* * * * *